W. RUBLY.
WALL FASTENING.
APPLICATION FILED JAN. 27, 1913.
1,159,420.
Patented Nov. 9, 1915.
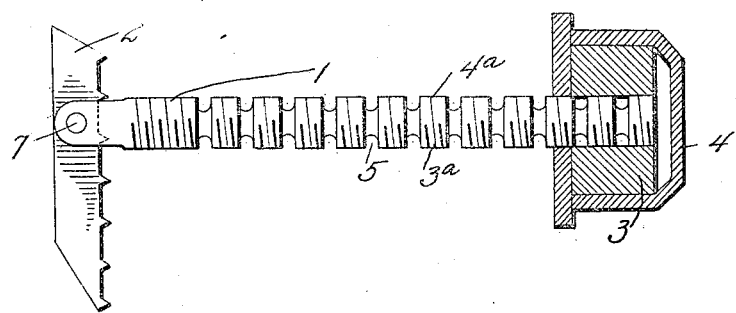
Witnesses
Inventor
WILLIAM RUBLY,
By
Attorneys

UNITED STATES PATENT OFFICE.

WILLIAM RUBLY, OF TUCKAHOE, NEW YORK.

WALL-FASTENING.

1,159,420.	Specification of Letters Patent.	Patented Nov. 9, 1915.

Application filed January 27, 1913. Serial No. 744,278.

*To all whom it may concern:*

Be it known that I, WILLIAM RUBLY, a citizen of the United States, residing at Tuckahoe, county of Westchester, State of New York, have invented certain new and useful Improvements in Wall-Fastenings, of which the following is a clear, full, and exact description.

This invention relates to an improved wall fastening, often known in the trade as an anchor bolt. Such device is one which carries at one end a pivoted anchor piece, at the end of a threaded shank, so that a device may be fastened to the wall or other article by first drilling a hole of substantially the same size as the diameter of the threaded shank; then inserting the shank through the hole, so that the pivoted anchor piece may be allowed to swing on its pivot across the diameter of the hole and prevent the withdrawal of the bolt; a suitable nut or other fixture finishes the device to hold it in place, or anything supported by it.

The object of this invention is to provide a bolt having a threaded shank with a plurality of recesses on the shank between different portions of the thread to permit a ready breaking of the shank after it is put in place in the wall. These recesses appear on each side of a threaded portion, and a nut is provided, which will span the recesses, and will always engage at least one of the threaded portions.

In the drawing, the figure is a view in side elevation, partly in section, of the wall fastening.

My improved anchor bolt consists of a threaded spindle or shank 1, an anchoring element 2, a nut 3, and a cap 4 for the nut. The threads 3ª of the shank are formed in the periphery of a plurality of hubs or shoulders 4ª separated by annular depressions 5. One end of the shank 1 is pivoted, as at 7, to the anchor 2.

The spindle or shank 1 may be formed in any suitable manner, that is to say, the shoulders 4ª may be produced by rolling the shank under pressure, which will produce the depressions 5 at the same time forcing the material of the shank between the dies up to form the shoulders 4ª. The object of providing a shank of this character is to adapt the shank to be easily broken off at a depressed portion upon the nut 3 being screwed home.

The cover part 4 is provided to give a finish to the nut, and it is made of a stamping corresponding to the shape and the size of the nut so that it will slip over and frictionally grasp the nut and be maintained thereby.

I claim as my invention:—

1. A threaded fastening bolt having external threads, and a nut rotatable on said threads, the threads being interrupted and depressions produced at intervals along said bolt, said nut adapted to span such depressions and engage the threads on each side thereof at the same time.

2. A toggle bolt, comprising, in combination, a shank having external screw-threads, a pivotal anchor piece carried by said shank, and a nut rotatable on the screw-threads, the threads being interrupted and depressions produced at intervals along the shank, said nut adapted to span such depressions and engage the threads on each side thereof at the same time.

Signed at Tuckahoe in the county of Westchester and State of New York, this 21st day of December, 1912.

WILLIAM RUBLY.

Witnesses:
W. R. WATSON,
F. WARREN WRIGHT.